(12) United States Patent
Gaebe

(10) Patent No.: US 6,600,604 B2
(45) Date of Patent: *Jul. 29, 2003

(54) ATHERMAL THIN FILM FILTER

(75) Inventor: Carl Gaebe, Ellicott City, MD (US)

(73) Assignee: Ciena Corporation, Linthicum, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/728,995

(22) Filed: Dec. 4, 2000

(65) Prior Publication Data

US 2001/0030810 A1 Oct. 18, 2001

Related U.S. Application Data

(63) Continuation-in-part of application No. 09/551,138, filed on Apr. 17, 2000, now Pat. No. 6,278,549.

(51) Int. Cl.$^7$ ................................. G02B 1/10
(52) U.S. Cl. ................ 359/582; 359/584; 427/165; 356/454
(58) Field of Search ................ 359/582, 584, 359/588, 586, 590, 260, 124, 127; 372/92, 99, 97; 356/454, 477, 480, 505, 506; 427/162, 164, 165

(56) References Cited

U.S. PATENT DOCUMENTS

| | | | | |
|---|---|---|---|---|
| 3,578,848 A | * | 5/1971 | Austin | 359/584 |
| 4,152,674 A | * | 5/1979 | Taguchi | 356/519 |
| 4,813,756 A | * | 3/1989 | Frenkel et al. | 359/127 |
| 5,056,099 A | | 10/1991 | Bradley | 372/49 |
| 5,212,584 A | * | 5/1993 | Chung | 359/260 |
| 5,651,023 A | | 7/1997 | MacKinnon | 372/107 |
| 5,949,560 A | * | 9/1999 | Roberts et al. | 359/110 |
| 5,982,488 A | * | 11/1999 | Shirasaki | 356/519 |
| 6,278,549 B1 | * | 8/2001 | Gaebe | 359/124 |
| 6,437,916 B1 | * | 8/2002 | McLeod et al. | 359/499 |
| 6,452,725 B1 | * | 9/2002 | Sterling et al. | 359/577 |
| 6,486,999 B1 | * | 11/2002 | Ackerman et al. | 359/288 |

OTHER PUBLICATIONS

Shirasaki, M., Temperature Independent Interferometer for WDM Filters, in 22nd European Conference on Optical Communication, vol. 3, 147–150, 1996.*

Pedrotti, F. L., Pedrotti, L. S., Introduction to Optics, Prentice–Hall, New Jersey, 1993.*

M. Shirasaki, "Temperature Insensitive Design of Fabry–Perot Etalon", IEEE Photonics Tech. Lett., vol. 11, No. 11, pp. 1431–1433, Nov. 1999.*

Takashashi, "Temperature Stability of Thin–Film Narrow–Bandpass Filters Produced by Ion–Assisted Deposition", Applied Optics, vol. 34, No. 4, 1995, pp. 667–675.

* cited by examiner

*Primary Examiner*—Thong Nguyen
*Assistant Examiner*—Arnel C. Lavarias
(74) *Attorney, Agent, or Firm*—Michael R. Cammarata

(57) ABSTRACT

An optical filter including a plurality of dielectric layers is provided between first and second substrates. The substrates have a coefficient of thermal expansion that is greater than that of the dielectric layers, and the thicknesses of the substrates are selected to provide compensation for temperature-dependant variations in the center wavelength of the filter. A variety of substrate materials may be used. Quartz is advantageous as a substrate material because it has relatively low loss at wavelengths commonly used in telecommunication systems. Moreover, it is thermally and chemically stable, and has good adhesion to most dielectric films used as quarter and half wave layers. Further, quartz is mechanically tough, relatively inexpensive and readily available. The quartz substrate is cut from a crystal and has an orientation with reduced birefringence.

14 Claims, 7 Drawing Sheets

ATHERMAL THIN FILM FILTER

CROSS REFERENCE TO RELATED APPLICATIONS

The present application is a continuation-in-part of U.S. patent application Ser. No. 09/551,138, filed Apr. 17, 2000 and issued on Aug. 21, 2002 as U.S. Pat. No. 6,278,549, the teachings of which are incorporated herein by reference.

FIELD OF THE INVENTION

The present invention is directed toward optical filters, and in particular to optical filters having a center wavelength that is substantially independent of temperature.

BACKGROUND OF THE INVENTION

Optical interference filters rely on principles of interference that modify reflected intensities of light incident on a surface. A familiar example of interference is the colors created when light reflects from a thin layer of oil floating on water. Briefly stated, by modifying the interface of a substance and its environment with a third material, reflectivity of the substance can be significantly altered. This principle is used in the fabrication of optical interference filters. These filters can be used as one of, or as the main filtering element in optical add/drop multiplexers, for example, employed in optical communication systems to select one or more channels from a transmission signal.

In its most simple form, an optical interference filter includes a reflective layer provided on a substrate. The reflection layer includes a cavity including two partial reflectors or mirror layers separated by a spacer. Each partial reflector, also referred to as a quarter-wave stack, includes alternating layers of high and low refractive index dielectric materials. Each of these layers has an optical thickness (defined as: physical thickness x refractive index) of a quarter-wavelength ($\lambda/4$), where $\lambda$ is a "center wavelength", i.e., the wavelength of light to be transmitted by the filter. The spacer typically further includes at least one half-wave (or multiple half-wave) layer, and thus typically has twice the thickness of an individual quarter-wave layer. By appropriate choice of dielectric materials, the interference filter can be designed to transmit optical signals within a relatively narrow band about $\lambda$ through the reflection layer and the substrate, while wavelengths outside the band are reflected. Typically, many cavities are provided on a substrate.

A filter that reflects a desired wavelength while transmitting other wavelengths can also be constructed by forming a reflective layer with one or more cavities having appropriately selected thicknesses of the quarter and half wave layers.

Filters are typically manufactured by sputtering, for example, the quarter and half wave dielectric layers onto the substrate. The substrate must therefore have good adhesion to these dielectric layers. Moreover, since the filters are often critical components in telecommunications equipment and are frequently placed in harsh environments, the substrate should preferably have good mechanical strength as well as excellent chemical and atmospheric resistance. The substrates should also transmit light with little loss, and have a refractive index of 1.5 to 1.6 for use in optical communications systems carrying signals at wavelengths in the range of 1270 to 1670 nm. Further, the substrate should provide an effective coefficient of thermal expansion in the range of 9–13 ppm/C°. If Young's Modulus and Poisson's ratio are then taken into account, the filter will have relatively low wavelength dependence.

Many substrates are commercially available for incorporation into optical filters, but lack one or more of the criteria identified above. In particular, many commercially available substrates degrade or lose adhesion when exposed to relatively high temperatures and humidities. Also, conventional filter designs have failed to adequately account for temperature-dependant wavelength variation. Single-sided substrate filters, when bonded to another element such as a Grin lens, can also lose their temperature independence by virtue of a mismatch in the thermal expansion between the filter and the Grin lens.

SUMMARY OF THE INVENTION

Consistent with the present invention, an optical filter is provided comprising a single crystal or crystalline quartz (hereinafter referred to as "quartz") substrate and a reflective layer provided on the quartz substrate. According to another aspect of the invention, an optical filter is provided comprising a reflective layer provided between first and second substrates. In either arrangement, the reflective layer has an associated center wavelength, which is substantially independent of temperature.

BRIEF DESCRIPTION OF THE DRAWINGS

Advantages of the present invention will be apparent from the following detailed description of the presently preferred embodiments thereof, which description should be considered in conjunction with the accompanying drawings in which.

DETAILED DESCRIPTION

Consistent with the present invention, an optical filter may include a plurality of dielectric layers provided on a quartz substrate. Quartz is advantageous as a substrate material because it has relatively low loss at wavelengths commonly used in telecommunication systems. Moreover, it is thermally and chemically stable, and has good adhesion to most dielectric films used as quarter and half wave layers. Further, quartz is mechanically tough, relatively inexpensive and readily available.

Quartz, however, is a single crystal or crystalline material that is birefringent to light propagating along most axes through the crystal. Accordingly, light propagating along these axes will experience different refractive indices depending on its polarization and angle of incidence to the crystal, possibly inducing polarization dependent loss (PDL)

and polarization mode dispersion (PMD). Nevertheless, if light propagates in a direction parallel to the c or z-axis in the crystal, it will not appear birefringent, since the refractive index will be the same or substantially the same for all polarizations. That is, the polarization axis will always be perpendicular to the c axis of the crystal.

However, the thermal expansion of quartz perpendicular to the c axis is relatively high ($14.4 \times 10^{-6\circ}$ C.$^{-1}$). Thus, the quartz substrate consistent with an aspect of the present invention has a thickness sufficient to offset any temperature-related thickness and/or refractive index variations of the deposited thin films. As a result, temperature-related wavelength shifts of the filter are significantly reduced.

Figure 1:
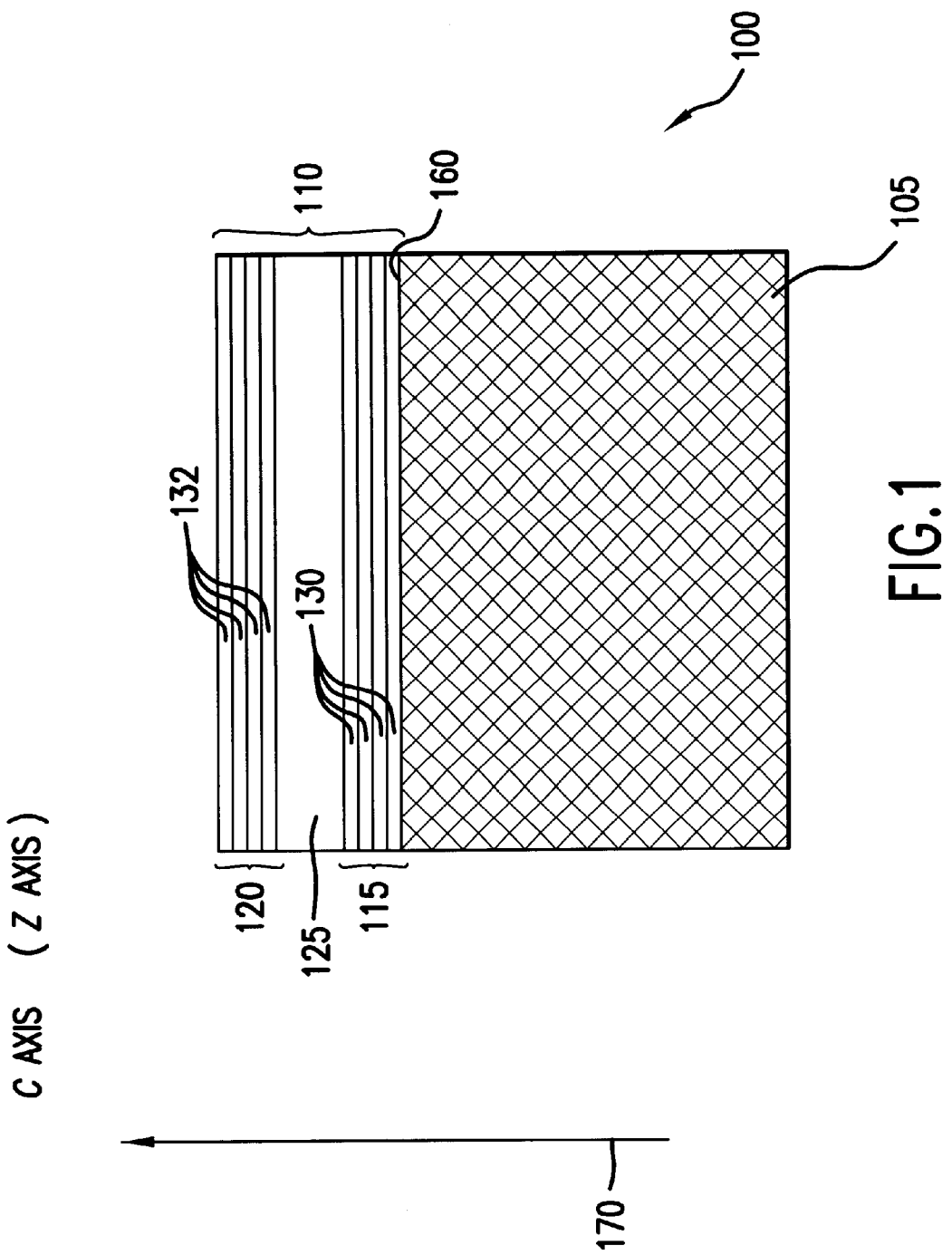
FIG. 1 illustrates a cross-sectional view of an optical filter consistent with an aspect of the present invention.

Turning to the drawings in which like reference characters indicate the same or similar elements in each of the several views, FIG. 1 illustrates an optical filter 100 including a quartz substrate 105 and a reflective layer 110. Reflective layer 110 includes first and second mirror layers 115 and 120, and a spacer layer 125 provided therebetween. As generally understood, mirror layers 115 and 120 include pluralities of dielectric thin films or layers 130 and 132, respectively. These layers are often formed from tantalum pentoxide and silicon dioxide, or other suitable dielectric materials, all of which adhere well to quartz.

As further shown in FIG. 1, reflective layer 110 is deposited on a primary surface 160 of substrate 105. For reasons discussed in greater detail below, a normal direction to surface 160, as indicated by arrow 170, is preferably oriented parallel to a c axis of quartz crystal substrate 105. The c axis is thus preferably perpendicular to the primary surface of the substrate and the thin film layers deposited thereon.

Figure 2:
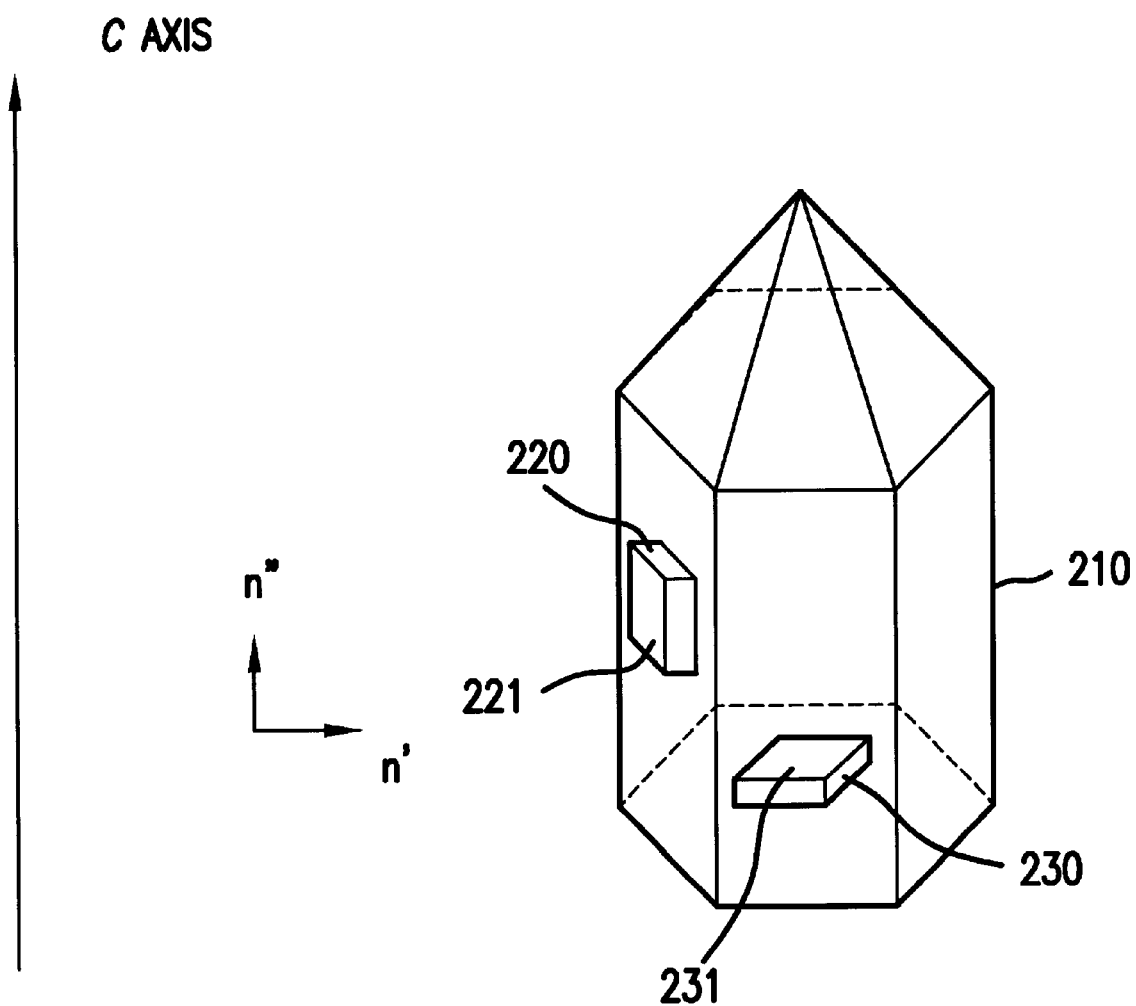
FIG. 2 illustrates substrates cut from different portions of a quartz crystal.

FIG. 2 illustrates two substrates, 220 and 230, which can be cut from quartz crystal 210. The optical properties of quartz are such that light incident to primary surface 221 of substrate 220 has polarization components that are parallel to the c axis, and experiences different refractive indices n' and n" in the orthogonal directions in the plane of surface 221. Accordingly, substrate 220 is considered birefringent, and can introduce unwanted polarization effects, such as PDL and PMD.

Substrate 230, however, is cut so that the normal to primary surface 231 is parallel to the c axis. Thus, light incident to surface 231 along the normal does not have polarization components parallel to the c axis, and the refractive index for any polarization direction within the plane of surface 231 is the same. Light traveling normal to the surface of substrate 230 does not experience birefringence, and deleterious polarization-related effects do not arise.

Substrate 230, however, has a relatively high coefficient of thermal expansion in a lateral direction relative to the deposited thin films. Accordingly, in proportion to its relative thickness, substrate 230 will effectively "stretch" thin films deposited thereon with increasing temperature. If the substrate is made very thin, the films will be substantially unrestrained by the substrate, and will expand more nearly according to their inherent thermal expansion. In any case, the films will be deformed under varying thermal conditions, causing the reflected or transmitted wavelengths through the films to change as well.

Figure 3:
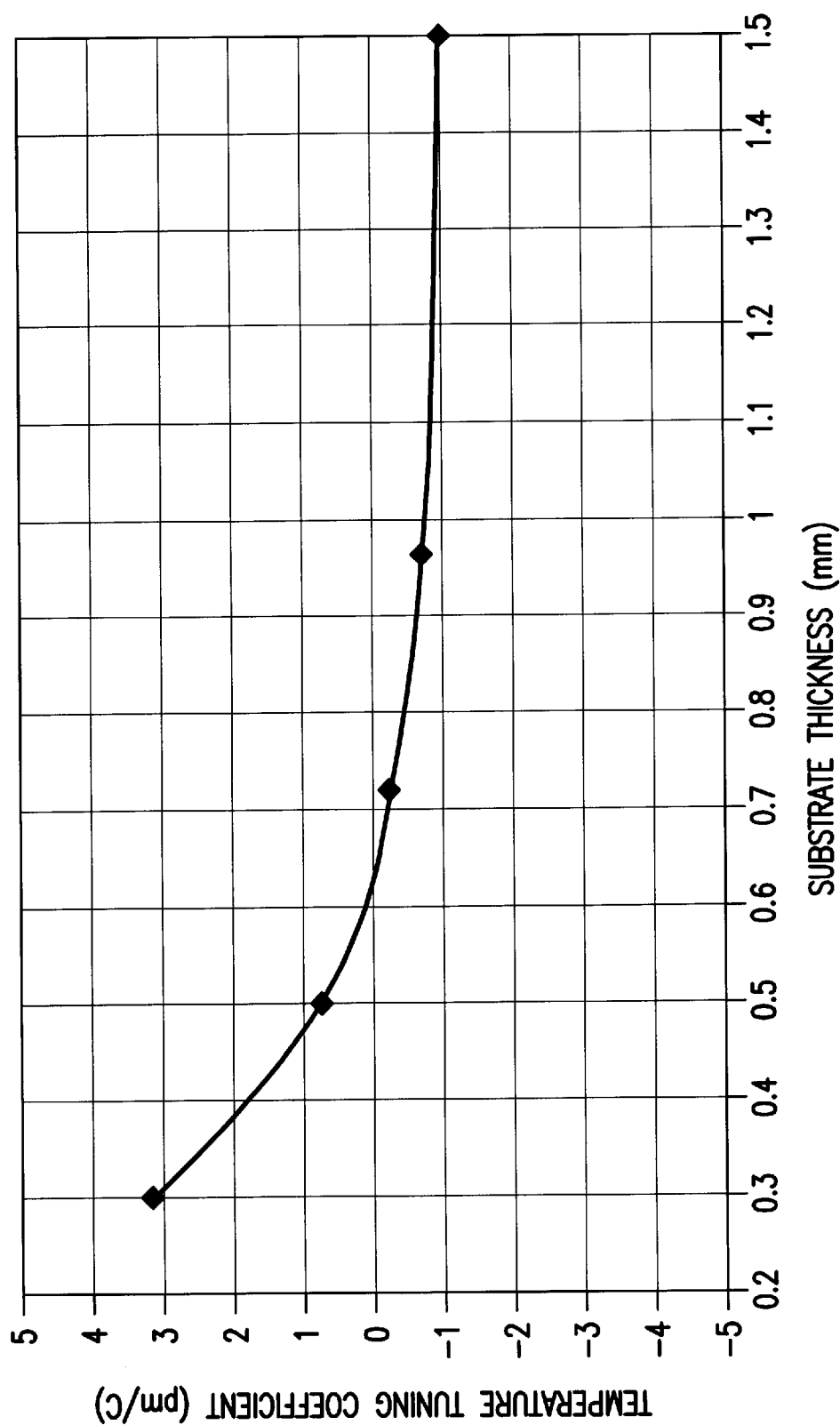
FIG. 3 illustrates a plot of temperature tuning coefficient vs. substrate thickness.

FIG. 3 is a plot illustrating quantitatively temperature-dependent center wavelength shift, expressed as a temperature tuning coefficient in units of picometers/° C., as a function of substrate thickness. The temperature tuning coefficient is a measure of the center wavelength dependence on temperature. If the temperature tuning coefficient is relatively large, the center wavelength will vary substantially with temperature. On the other hand, a small tuning coefficient will yield small changes in center wavelength with temperature. In any event, the temperature tuning coefficient should be zero or approximately equal to zero to minimize any variation in the center wavelength due to temperature (i.e., the center wavelength is substantially independent of temperature). This can occur if the substrate is thinned to have an exemplary substrate thickness of about 0.65 mm. In which case, the substrate is thick enough to stretch the thin films to offset temperature-related changes in optical thickness (defined as refractive index x physical thickness) of the films, but it is not so thick that it overcompensates these changes.

The above-described thickness of 0.65 mm is exemplary, and is suitable for thin films comprising 100–200 layers of silicon dioxide and tantalum pentoxide and having thicknesses of about 800 nm (half wave) and 400 nm (quarter wave). Other materials or film thicknesses may require different quartz substrate thicknesses to compensate for temperature-related shifts in the center wavelength.

After the substrate is cut, the primary surface is appropriately oriented in a sputtering chamber, for example, to receive a plurality of thin films that will make up the quarter and half-wave layers. The films are then successively deposited in a known manner.

Figure 4:
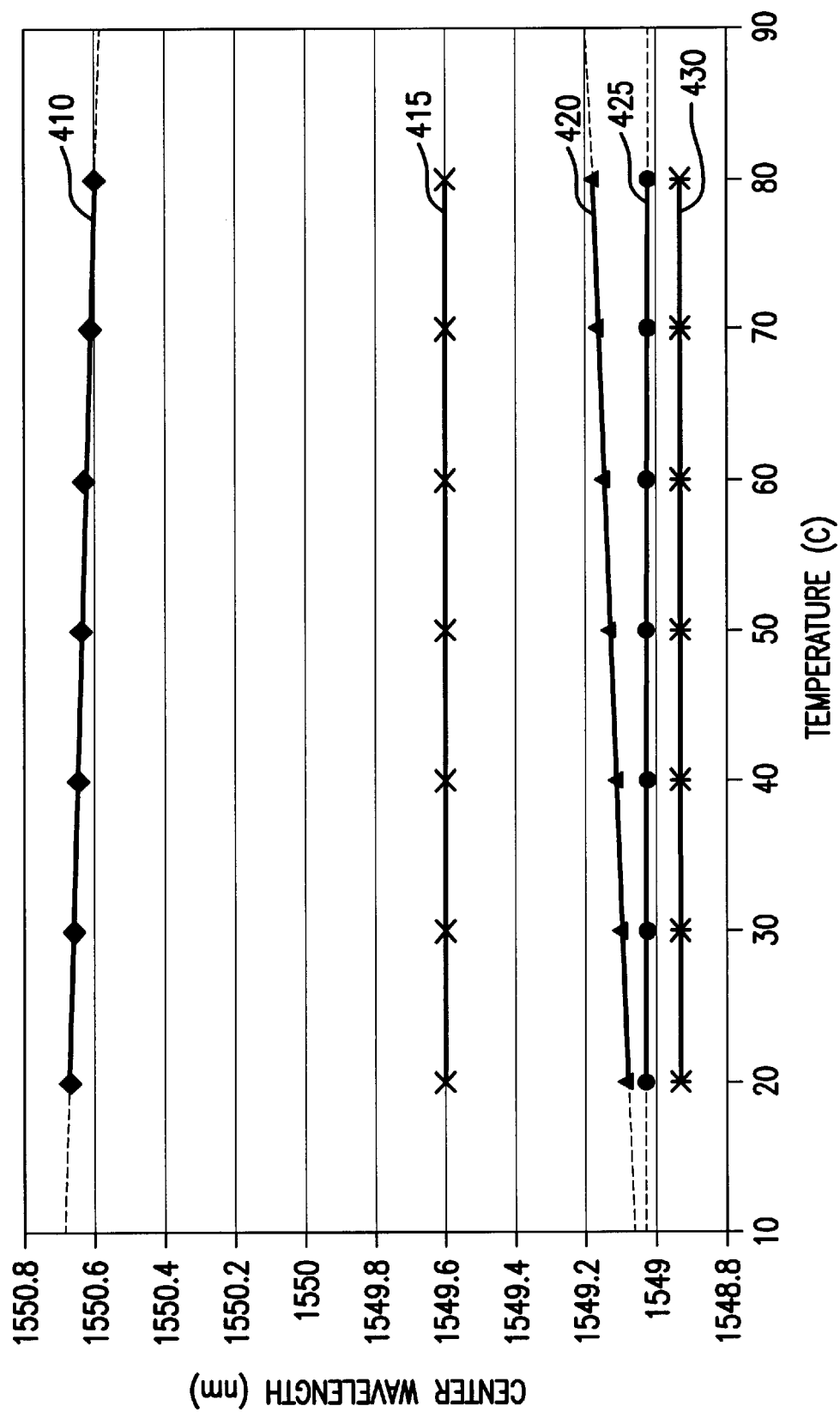
FIG. 4 illustrates plots of center wavelengths vs. temperature for different filters consistent with an aspect of the present invention.

FIG. 4 illustrates plots 410, 415, 420, 425 and 430 of center wavelength as a function of temperature for five filters consistent with the present invention. Plots 410, 415, 420, 425 and 430 show that the center wavelength does not vary by more than 0.2 nm over a temperature range of 20° to 80° C. Moreover, center wavelengths associated with plot 415, for example, vary less than 0.025 nm over this temperature range.

Figure 5:
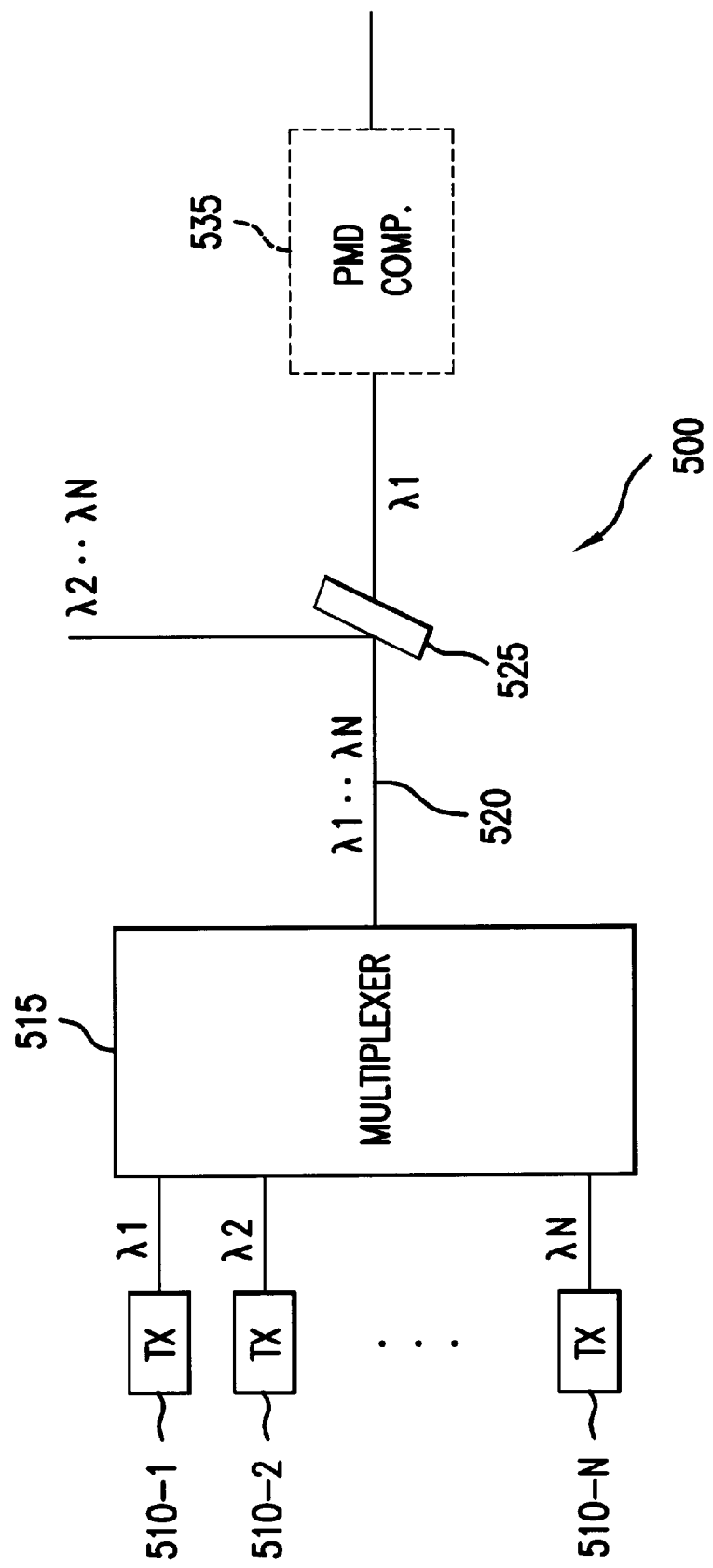
FIG. 5 illustrates a wavelength division multiplexed optical communication system consistent with a further aspect of the present invention.

FIG. 5 illustrates a portion of a wavelength division multiplexed (WDM) system 500 consistent with a further aspect of the present invention. System 500 includes a plurality of optical transmitters 510-1 to 510-N, each emitting a respective one of a plurality of optical signals, each at a corresponding one of wavelengths λ1 to λN. The optical signals are combined onto an optical communication path, such as fiber 520, by multiplexer 515. The optical signals next propagate on fiber 520 and impinge on filter 525, having a structure similar to that discussed above in reference to FIG. 1. Filter 525, in this example, is configured to transmit optical signals at wavelength λ1, while reflecting remaining wavelengths λ2 to λN. Accordingly, signals at λ1 can be dropped, for example, from the group of signals supplied to filter 525, and supplied to appropriate circuitry (not shown) for detection and processing.

As indicated above, center wavelength of filter 525, λ1 in this instance, does not vary substantially with temperature. Accordingly, filter 525 reliably reflects optical signals at wavelength λ1 over a relatively wide temperature range, thereby improving system performance.

If system specifications permit a relatively small amount of polarization mode dispersion, the substrate may be cut such that the normal to the primary surface is not entirely parallel to the c axis. In which case, some birefringence may be present. If the birefringence is unacceptably high, however, a conventional PMD compensator, such as that described, for example, in U.S. Pat. No. 5,859,939, incorporated by reference herein, may be used to minimize any undesirable polarization-related effects. As further shown in FIG. 5, such a PMD compensator 535 may be coupled to filter 525 to reduce PMD in the λ1 optical signals output from the filter.

Figure 6:
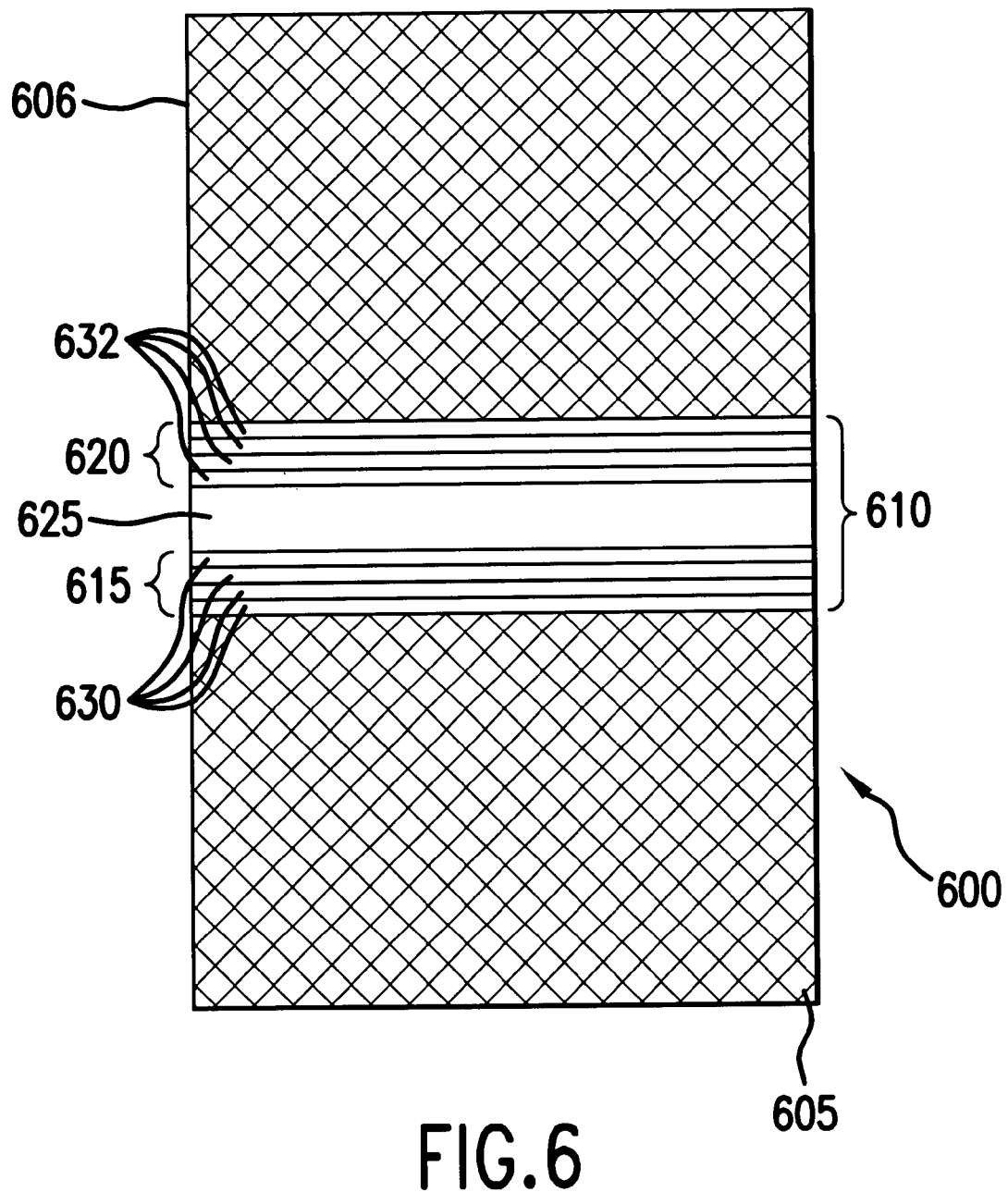
FIG. 6 illustrates a cross-sectional view of another optical filter consistent with an aspect of the present invention.

Turning now to FIG. 6, there is shown an exemplary optical filter 600 consistent with the invention. The optical filter 600 includes a reflective layer 610 disposed between first 605 and second 606 substrates. In the illustrated embodiment, reflective layer 610 includes first and second mirror layers 615 and 620, and a spacer layer 625 provided therebetween. Again, mirror layers 615 and 620 may include pluralities of dielectric thin films or layers 630 and 632, respectively. As discussed above, the layers may be formed from materials that adhere well to the substrates, such as tantalum pentoxide and silicon dioxide, or other suitable dielectric materials.

The substrates 605 and 606 may be formed from crystalline quartz, in the manner described above, or from other materials exhibiting a coefficient of thermal expansion that is relatively higher than that of the thin films 630 and 632. The coefficient of thermal expansion may, for example, be in the range from about 9–15 ppm/° C. It is to be understood, however, that the coefficient of thermal expansion for the substrates need only be high relative to that of the thin films to allow compensation for temperature-related variations in the center wavelength of the reflective layer 610. Commercially available high coefficient of thermal expansion materials include WMS 13 glass sold by Ohara Corporation of Somerville, N.J., and F7 glass available from Schott Glass Technologies, Inc. of Duryea, Pa. Also, it is to be understood that the first and second substrates may be formed from different materials, e.g. the first substrate may be quartz while the second substrate may be glass.

As described above, the temperature tuning coefficient of the filter should be zero or approximately equal to zero to minimize any variation in the center wavelength due to temperature (i.e., the center wavelength is substantially independent of temperature). In an embodiment including first and second substrates, as illustrated for example in FIG. 6, this can occur, for example, if the substrates are constructed from the Ohara WMS 13 material and thinned to have an exemplary substrate thickness of 0.8 mm on each side of the reflective layer 610. In which case, the substrates are thick enough to stretch the thin films to offset temperature-related changes in optical thickness (defined as refractive index x physical thickness) of the films, but are not so thick that they overcompensate these changes.

It is to be understood that the above-described thicknesses of 0.8 mm are exemplary, and are suitable for thin films comprising 100–200 layers of silicon dioxide and tantalum pentoxide and having thicknesses of about 800 nm (half wave) and 400 nm (quarter wave). Other materials or film thicknesses may require different substrate thicknesses to compensate for temperature-related shifts in the center wavelength.

In constructing a filter having first and second substrates, as shown for example in FIG. 6, the thin films that will make up the quarter and half-wave layers of the reflective layer may be successively deposited on a first substrate in a known manner. The second substrate may be epoxied onto the reflective layer, e.g. using a thermally cured epoxy. Both substrates may then be thinned to an appropriate thickness to achieve the desired compensation for temperature-related center wavelength variations.

Figure 7:
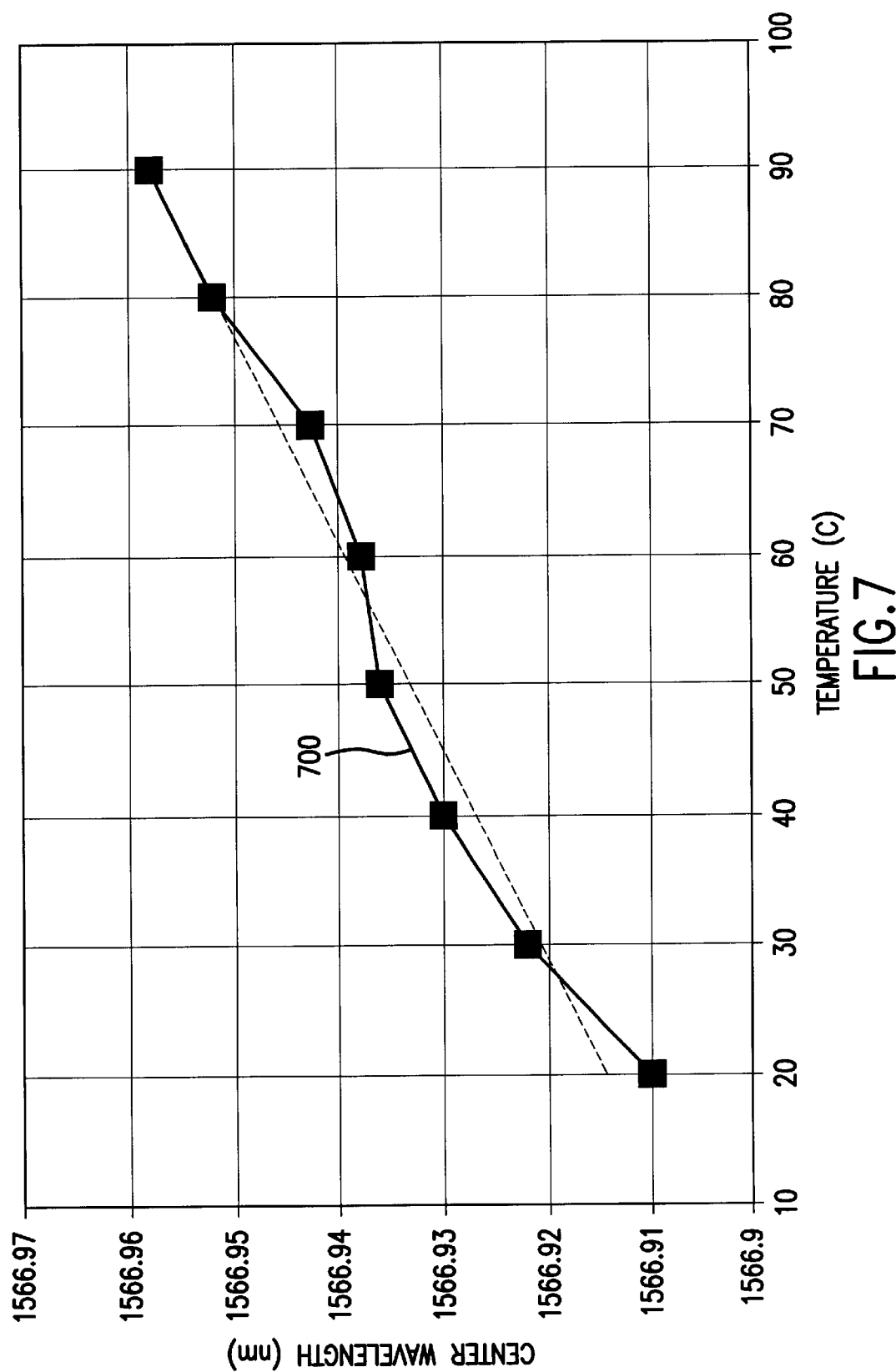
FIG. 7 illustrates a plot of center wavelength vs. temperature for a filter as illustrated, for example, in FIG. 6.

Turning now to FIG. 7, there is illustrated a plot 700 of center wavelength as a function of temperature for an exemplary filter having first and second substrates consistent with the present invention. Plot 700 shows that the center wavelength does not vary by more than 0.05 nm over a temperature range of 20° to 90° C. Advantageously, this performance is not substantially affected when the filter is bonded to other optical components such as a GRIN lens.

While the foregoing invention has been described in terms of the embodiments discussed above, numerous variations are possible. Accordingly, modifications and changes such as those suggested above, but not limited thereto, are considered to be within the scope of the following claims.

What is claimed is:

1. A thin film optical filter, comprising:

first and second substrates; and a reflective layer provided between said first and second substrates, said reflective layer including a first mirror layer having a first plurality of thin film dielectric layers; a second mirror layer having a second plurality of thin film dielectric layers; and a thin film dielectric spacer layer provided between said first and second mirror layers, said reflective layer having an associated center wavelength, wherein said first and second substrates have a respective thickness and coefficient of thermal expansion chosen such that the center wavelength of said reflective layer is substantially independent of temperature, wherein said first and second substrates comprise quartz crystal, wherein each of said first and second substrates has an associated primary surface and an associated c axis crystallographic orientation which is substantially perpendicular to said associated primary surface, and wherein said first and second mirror layers are respectively provided on the primary surfaces of the first and second substrates and substantially perpendicular to the c axis.

2. A thin film optical filter in accordance with claim 1, wherein said reflection layer is provided between said primary surfaces of said first and second substrates.

3. A thin film optical filter in accordance with claim 1, wherein each of said first and second substrates has an associated primary surface and an associated first refractive index in a first direction in said associated primary surface equal to an associated second refractive index in a second direction different than said first direction in said associated primary surface.

4. A thin film optical filter in accordance with claim 3, wherein said reflection layer is provided on said primary surface of said first substrate.

5. A thin film optical filter in accordance with claim 1, wherein said center wavelength varies less than 0.05 nm over a temperature range of 20° to 90° C.

6. A thin film optical filter in accordance with claim 1, wherein said first substrate exhibits a first coefficient of thermal expansion and said second substrate exhibits a second coefficient of thermal expansion, said first and second coefficients of thermal expansion being greater than a coefficient of thermal expansion of said reflective layer.

7. A thin film optical filter in accordance with claim 6, wherein said first coefficient of thermal expansion is substantially equal to said second coefficient of thermal expansion.

8. A method of manufacturing a thin film optical filter, comprising the steps of:

providing a first substrate for receiving a plurality of thin film dielectric layers, wherein the first substrate has a first thermal expansion coefficient;

depositing each of said plurality of thin film dielectric layers on said first substrate;

securing a second substrate to said plurality of thin film dielectric layers, wherein the second substrate has a second thermal expansion coefficient; and adjusting a thickness of said first and second substrates, wherein the thickness, the first thermal expansion coefficient and the second thermal expansion coefficient are selected such that a center wavelength associated with said thin film filter is substantially temperature independent, wherein said first and second substrates comprise quartz crystal, wherein said first substrate has a primary surface and a c axis crystallographic orientation which is substantially perpendicular to the primary surface, each of said plurality of dielectric layers being oriented substantially perpendicular to the c axis.

9. A method in accordance with claim 8, wherein said center wavelength varies less than 0.05 nm over a temperature range of 20° to 90° C.

10. A wavelength division multiplexed optical communication system, comprising:

a plurality of optical transmitters, each of which emitting a corresponding one of a plurality of optical signals, each of said plurality of optical signals being at a corresponding one of a plurality of wavelengths;

an optical multiplexer coupled to said plurality of optical transmitters, said optical multiplexer supplying said plurality of optical signals to an optical communication path; and an optical thin film filter coupled to said optical communication path, said optical filter including:

first and second substrates; and a reflective layer provided between said first and second substrates, said reflective layer including a first mirror layer having a first plurality of thin film dielectric layers; a second mirror layer having a second plurality of thin film dielectric layers; and a thin film dielectric spacer layer provided between said first and second mirror layers, said reflective layer having an associated center wavelength corresponding to one of said plurality of wavelengths, whereby at least one of said plurality of optical signals at said center wavelength is selected by said thin film filter, wherein said first and second substrates have a respective thickness and coefficient of thermal expansion chosen such that the center wavelength of said reflective layer is substantially independent of temperature, wherein said first and second substrates comprise quartz crystal, wherein each of said first and second substrates has an associated primary surface and an associated c axis crystallographic orientation which is substantially perpendicular to said associated primary surface, and wherein said first and second mirror layers are respectively provided on the primary surfaces of the first and second substrates and substantially perpendicular to the c axis.

11. A wavelength division multiplexed optical communication system in accordance with claim 10, wherein said reflection layer is provided between said primary surfaces of said first and second substrates.

12. A wavelength division multiplexed optical communication system in accordance with claim 10, wherein each of said first and second substrates has an associated primary surface and an associated first refractive index in a first direction in said associated primary surface equal to an associated second refractive index in a second direction different than said first direction in said associated primary surface.

13. A wavelength division multiplexed optical communication system in accordance with claim 12, wherein said reflection layer is provided on said primary surface of said first substrate.

14. A wavelength division multiplexed optical communication system in accordance with claim 10, further comprising a polarization mode dispersion compensator coupled to said thin film filter.

* * * * *